(12) United States Patent
Dietz et al.

(10) Patent No.: US 11,763,641 B2
(45) Date of Patent: *Sep. 19, 2023

(54) ELECTRONIC DEVICE ARRANGEMENT, METHOD FOR OPERATING AN ELECTRONIC DEVICE ARRANGEMENT, SECURITY DEVICE, AND AUTOMATED TELLER MACHINE

(71) Applicant: Wincor Nixdorf International GmbH, Paderborn (DE)

(72) Inventors: Oliver Dietz, Borchen (DE); Stefan Schmelter, Paderborn (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 136 days.

This patent is subject to a terminal disclaimer.

(21) Appl. No.: 17/216,534

(22) Filed: Mar. 29, 2021

(65) Prior Publication Data

US 2021/0241585 A1 Aug. 5, 2021

Related U.S. Application Data

(63) Continuation of application No. 16/413,558, filed on May 15, 2019, now Pat. No. 11,164,430.

(30) Foreign Application Priority Data

May 16, 2018 (EP) .................................... 18172612

(51) Int. Cl.
G07F 19/00 (2006.01)
G07C 9/00 (2020.01)

(52) U.S. Cl.
CPC ....... *G07F 19/205* (2013.01); *G07C 9/00912* (2013.01); *G07C 9/00944* (2013.01);
(Continued)

(58) Field of Classification Search
None
See application file for complete search history.

(56) References Cited

U.S. PATENT DOCUMENTS 7,382,226 B2 * 6/2008 Monnier ............... G07F 19/205
340/5.74
9,170,914 B2 * 10/2015 Markel ............... G06F 11/3089
(Continued)

FOREIGN PATENT DOCUMENTS

GB 2527504 A * 12/2015 ........... G01R 31/021
WO 2016134421 A1 9/2016

OTHER PUBLICATIONS

European Search Report filed in the corresponding European application; 7 pages.

*Primary Examiner* — Thien M Le
*Assistant Examiner* — April A Taylor
(74) *Attorney, Agent, or Firm* — Black McCuskey (57) ABSTRACT

A Universal-Serial-Bus interface communicatively couples a first electronic device and a second electronic device with one another. The Universal-Serial-Bus interface includes an electrical connection structure to electrically connect the first electronic device and the second electronic device with one another and a switch to disconnect the electrical connection structure. A measurement circuit to measure one or more electrical properties is associated with the electrical connection structure and/or the first electronic device. One or more processors configured to control the switch based on the measured one or more electrical properties.

12 Claims, 6 Drawing Sheets

(52) U.S. Cl.
CPC .......... *G07F 19/201* (2013.01); *G07F 19/209* (2013.01); *G07C 2009/00952* (2013.01)

(56) References Cited

U.S. PATENT DOCUMENTS

| | | |
|---|---|---|
| 2010/0023744 A1 | 1/2010 | Markel et al. |
| 2015/0109002 A1 | 4/2015 | Dichtl et al. |
| 2018/0032717 A1* | 2/2018 | Cronin .................. G07D 11/28 |

* cited by examiner

ELECTRONIC DEVICE ARRANGEMENT, METHOD FOR OPERATING AN ELECTRONIC DEVICE ARRANGEMENT, SECURITY DEVICE, AND AUTOMATED TELLER MACHINE

CROSS-REFERENCE TO RELATED APPLICATIONS

This application is a Continuation of U.S. patent application Ser. No. 16/413,558, filed May 15, 2019, now U.S. Pat. No. 11,164,430, issued Nov. 2, 2021, which claims priority to and the benefit of European Patent Application EP 18 172 612.6 filed 16 May 2018, the contents of which are hereby incorporated by reference in their entirety.

BACKGROUND

In general, an automated teller machine (ATM) or any other device may be prone to physical attacks and/or electronic attacks. As an example, one or more objects (e.g. money, gold, or other things of value) may be protected from unauthorized physical access via a safe unit or any other suitable mechanical protection structure of the ATM. However, to provide authorized access to the one or more objects disposed within the safe unit, e.g. for a user of the ATM, an electromechanical device may be operated inside the safe unit that allows transferring at least one of the objects out of the safe unit. This electromechanical device may directly or indirectly communicate with a computing device or any other electronic device outside the safe unit. As an example, the computing device may be disposed in a head unit of the ATM. For the communication between a first electronic device outside the safe unit (e.g. the computing device) and a second electronic device inside the safe unit (e.g. the electromechanical device) a communication interface may be implemented.

SUMMARY

Various embodiments relate generally to an electronic device arrangement, a method for operating an electronic device arrangement, a security device, and an automated teller machine including a security device.

Various embodiments are related to an electronic device arrangement including: a first electronic device; a second electronic device; and a Universal-Serial-Bus (USB) interface communicatively coupling the first electronic device and the second electronic device with one another, wherein the Universal-Serial-Bus interface includes an electrical connection structure to electrically connect the first electronic device and the second electronic device with one another and a switch to disconnect the electrical connection structure; a measurement circuit to measure one or more electrical properties associated with the electrical connection structure and/or the first electronic device; and one or more processors configured to control the switch based on the measured one or more electrical properties.

Various embodiments are related to a security device, e.g. for use in an electronic device arrangement, the security device may include: a first set of terminals to connect the security device with a Universal-Serial-Bus connector, a second set of terminals to connect the security device with an electronic device, a controllable terminal connection structure to connect the first set of terminals and the second set of terminals with one another and to disconnect the first set of terminals and the second set of terminals from one another to control a physical connection of the Universal-Serial-Bus connector to the electronic device; a measurement circuit coupled to the first set of terminals to measure one or more electrical properties associated with the Universal-Serial-Bus connector when connected to the first set of terminals; and one or more processors configured to control the controllable terminal connection structure based on the determined one or more electrical properties.

Various embodiments are related to an automated teller machine (ATM) including a security device to monitor and control a Universal-Serial-Bus interface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings.

DETAILED DESCRIPTION

The following detailed description refers to the accompanying drawings that show, by way of illustration, specific details and various embodiments. These embodiments are described in sufficient detail to enable those skilled. Other embodiments may be utilized, and structural, logical, and electrical changes may be made without departing from spirit or scope. The various embodiments are not necessarily mutually exclusive, as some embodiments can be combined with one or more other embodiments to form new embodiments. Various embodiments are described in connection with methods and various embodiments are described in connection with devices. However, it may be understood that embodiments described in connection with methods may similarly apply to the devices, and vice versa.

The terms "at least one" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The term "coupled" is used herein to mean any suitable type of connection, which may include a direct connection or an indirect connection. The term "electrically connected" that is used herein to describe an electrical connection between terminals, pins, etc., may be understood as an electrically conductive connection with, for example, ohmic behavior. An electrical connection may be provided by one or more metal wires, one or more metal pins, etc. The metal may be or may include, for example, copper, aluminum, silver, gold, etc.

The term "data" as used herein with reference to "control data" or "measurement data" may be understood to include information in any suitable analog or digital form. The one or more processors described herein may be configured as or part of a controller or of more than one controller.

The terms "processor" or "controller" as, for example, used herein may be understood as any kind of entity that allows processing data. The data may be processed in accordance with one or more specific functions executed by the processor or controller. Further, a processor or controller as used herein may be understood as any kind of circuit, e.g., any kind of analog or digital circuit. The term "processing" as for example used herein referring to data processing may be understood as any kind of operation, e.g., an I/O operation, and/or any kind of logic operation. An I/O operation may include, for example, storing and reading from a memory. In other words, one or more memories may be associated with the one or more processors described herein. The term "memory" as referred to herein may be understood as a non-transitory computer-readable medium in which data or information can be stored for retrieval.

The term "system" (e.g., a computing system, etc.) as described herein may be understood as a set of interacting elements, wherein the elements can be, by way of example and not of limitation, one or more mechanical components, one or more electrical components, one or more instructions (e.g., encoded in storage media), and/or one or more processors, and the like.

Various embodiments are related to a Universal-Serial-Bus (USB) interface that allows a communication between at least two electronic devices. USB is an industrial standard defining cables, connectors and protocols for connection, communication, and power supply. A connection of a host (also referred to as master) device (e.g. any suitable type of computing device) and one or more client (also referred to as slave) devices (e.g. I/O devices, sensors, controllers, etc.) may be standardize via the USB standard. The versions of the USB standard include USB 1.0 released in January 1996; USB 1.1 released in August 1998; USB 2.0 released in April 2000, USB 3.0 released in November 2008, USB 3.1 released in July 2013, USB 3.2 released in September 2017. Further, USB Battery Charging and USB Power Delivery standards are associated with the USB standard.

USB connectors may include male connectors (also referred to as plugs) and female connectors (also referred to as receptacles or ports). The connectors may be of various types, wherein a male and a female connector of the same type may fit together. The types may include: Type-A; Type-A Super Speed; Type-B; Type-B Super Speed; Type-C; Mini-A; Mini-B; Micro-A; Micro-B; Micro-B Super Speed. Some female connectors (e.g. Mini-AB, Micro-AB) may be configured to fit to different types of male connectors (e.g. to Mini-A and Mini-B, Micro-A and Micro-B). The Super Speed connectors may fit to the standard connectors associated therewith. In accordance with the types of connectors, various types of USB cables may be provided.

The connectors of Type-A and Type-B have four pins and the corresponding cables have four cores. Illustratively four single wires may be used to provide one four-core cable. The connectors of Mini/Micro-A and Mini/Micro-B type have five pins and the corresponding cables have five cores. The connectors of Type-A Super Speed and Type-B Super Speed have nine pins and the corresponding cables have nine cores. The connectors of Mini/Micro-A Super Speed and Mini/Micro-B Super Speed type have ten pins and the corresponding cables have ten cores. The connectors of Type-C have 24 pins (arranged in a twofold rotational symmetry) and the corresponding cables have 24 cores.

Figure 1:
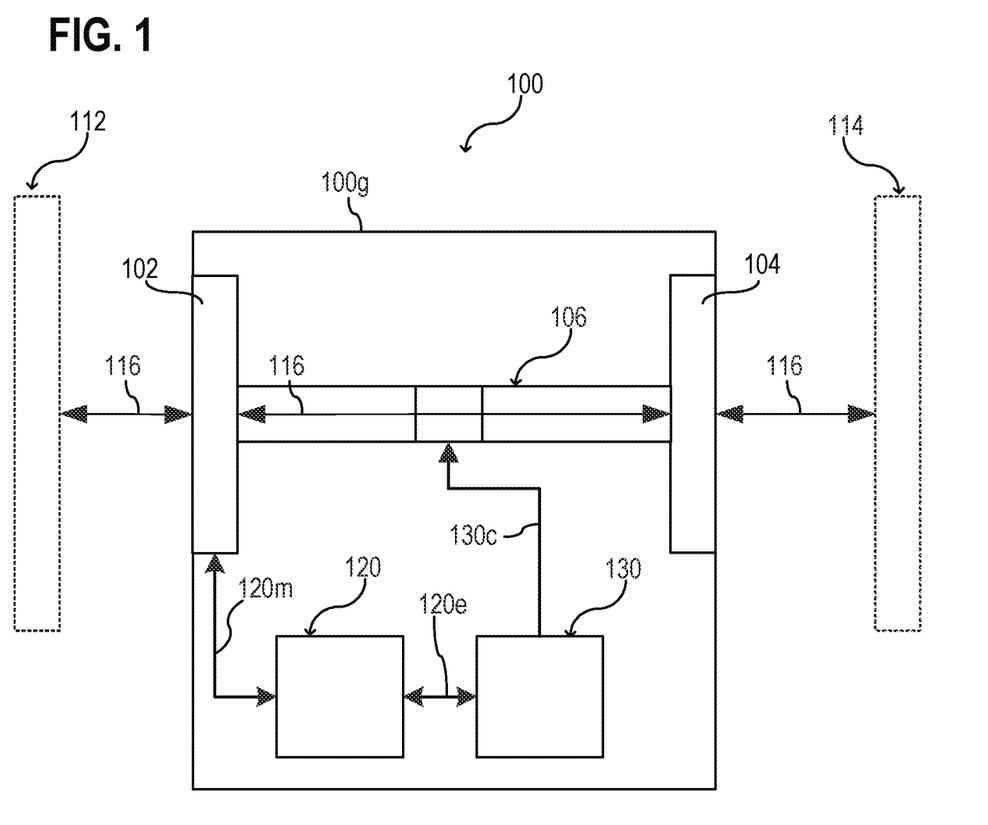
FIG. 1 is a schematic view showing a security device according to various embodiments.

There is illustrated in FIG. 1 a security device 100 in a schematic view, according to various embodiments. The security device 100 may include a first set of terminals 102 and a second set of terminals 104. The first set of terminals 102 may be configured to connect the security device 100 with a USB connector 112. The second set of terminals 104 may be configured to connect the security device 100 with an electronic device 114 (also referred to as second electronic device) Illustratively, the security device 100. i.e. at least the respective terminals 102, 104 of the security device 100, may be part of a USB interface that allows a communication of the electronic device 114 with another electronic device via the USB connector 112. The USB connector 112 may be a USB plug that may be plugged into a USB port of a computing device. Alternatively, the USB connector 112 may be USB port to host any suitable type of USB device.

The security device 100 may further include a controllable terminal connection structure 106. The controllable terminal connection structure 106 may be configured, selectively, to either connect the first set of terminals 102 or the second set of terminals 104 with one another and to disconnect the first set of terminals 102 and the second set of terminals 104 from one another. The controllable terminal connection structure 106 may be configured to control a physical connection 116 (e.g. an electrically conductive connection) of the USB connector 112 to the electronic device 114. Illustratively, the controllable terminal connection structure 106 may be configured either to connect the first set of terminals 102 and the second set of terminals 104 with one another (and therefore to allow a communication with the electronic device 114 via the USB connector 112) or to disconnect the first set of terminals 102 and the second set of terminals 104 from one another (and therefore to prevent a communication with the electronic device 114 via the USB connector 112) in a controlled manner.

The security device 100 may include a measurement circuit 120 to measure 120$m$ one or more electrical properties 120$e$ associated with the USB connector 112. Illustratively, the measurement circuit 120 may be used to check whether the USB connector 112 and/or an additional electronic device (e.g. a computing device) that is connect to the USB connector 112 may be manipulated.

As an example, when the USB connector 112 is properly configured and properly electrically connected to the first set of terminals 102, the one or more electrical properties 120$e$ measured via the measurement circuit 120 may be within one or more predefined reference ranges associated with the one or more electrical properties 120$e$. However, in the case that the USB connector 112 is manipulated, e.g. in the case of an attack, the one or more electrical properties 120$e$ measured via the measurement circuit 120 may be outside the one or more predefined reference ranges.

As another example, the USB connector 112 may be part of a computing device or may be coupled with a computing device. In this case, when the USB connector 112 is properly configured and properly electrically connected to the first set of terminals 102 and when the computing device is properly configured, the one or more electrical properties 120$e$ measured via the measurement circuit 120 may be within one or more predefined reference ranges accordingly. The predefined reference ranges may include one or more thresholds (e.g. lower and/or upper limits) associated with the respective values of the one or more electrical properties 120$e$.

However, in the case that the USB connector 112 and/or the computing device are manipulated, e.g. in the case of an attack to the USB connector 112 and/or to the computing device, the one or more electrical properties 120e measured via the measurement circuit 120 may be outside the one or more predefined reference ranges.

The security device 100 may include one or more processors 130 configured to control 130c the controllable terminal connection structure 106 based on the determined one or more electrical properties 120e. The one or more processors 130 may at least receive measurement data from the measurement circuit 120. In some embodiments, the one or more processors 130 may be configured to trigger and/or control the measurement circuit 120. The measurements 120m may be performed continuously or in predefined time intervals.

As an example, the one or more processors 130 may be configured to disconnect the first set of terminals 102 from the second set of terminals 104 in the case of an attack related to the USB connector 112. An attack may be detected based one the measurements 120m carried out via the measurement circuit 120, e.g. an attack may be detected if the one or more electrical properties 120e measured via the measurement circuit 120 are outside the one or more predefined reference ranges. As an example, a predefined electrical resistance may be associated with a non-manipulated USB connector 112. When the actual electrical resistance measured via the measurement circuit 120 differs from the predefined electrical resistance, an attack may be likely and the one or more processors 130 may physically disconnect the connection 116 between the USB connector 112 and the electronic device 114.

According to various embodiments, a control signal 130c may be provided from the one or more processors 130 to the controllable terminal connection structure 106, e.g. to a switch off the controllable terminal connection structure 106.

The security device 100 may include a housing 100g that surrounds the controllable terminal connection structure 106, the measurement circuit 120, the one or more processors 130, etc. The first set of terminals 102 and the second set of terminals 104 may be exposed to connect the USB connector 112 and the electronic device 114 accordingly.

Figure 2:
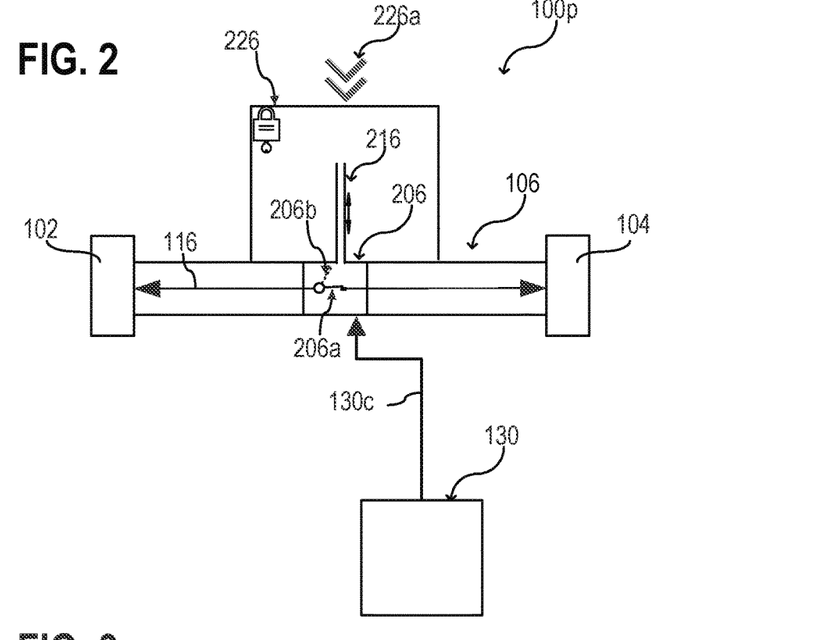
FIG. 2 is a schematic view showing a part of a security device according to various embodiments.

There is illustrated in FIG. 2 a part 100p of a security device 100 in a schematic view, according to various embodiments. According to various embodiments, the security device 100 illustrated in FIG. 1 may include the same of similar features as described with respect to the part 100p of the security device 100 illustrated in FIG. 2.

According to various embodiments, the controllable terminal connection structure 106 may include a switch 206 (e.g. an electrical switch, an electrical relay, etc.) that may be used to disconnect an electrically conductive connection 116 between the first set of terminals 102 and the second set of terminals 104. According to various embodiments, the switch 206 may be used to disconnect the physical connection 116 between the USB connector 112 and the electronic device 114 or in other words to disconnect the USB interface. As an example, the communication from and to the electronic device 114 may be prevented in the case of an attack. e.g. an attack carried out via the USB connector 112.

The switch 206 may have at least a first switching state 206a and a second switching state 206b. In the first switching state 206a, the first set of terminals 102 and the second set of terminals 104 are connected with one another. As an example, a first terminal of the first set of terminals 102, a second terminal of the first set of terminals 102, a third terminal of the first set of terminals 102, and a fourth terminal of the first set of terminals 102 are connected to a first terminal of the second set of terminals 104, a second terminal of the second set of terminals 104, a third terminal of the second set of terminals 104, and a fourth terminal of the second set of terminals 104 respectively. In the second switching state 206b, the first set of terminals 102 and the second set of terminals 104 are disconnected from one another. As an example, at least one of the terminals of the first set of terminals 102 is not connected to the corresponding terminal of the second set of terminals 104.

According to various embodiments, the one or more processors 130 may be configured to control the controllable terminal connection structure 106 only by switching the switch 206 from the first switching state 206a into the second switching state 206b. In other words, after switching the switch 206 from the first switching state 206a into the second switching state 206b, e.g. in the case of an attack, the switch 206 may not be switched back into the first switching state 206a via the one or more processors 130. This implements for example an additional security aspect, since it may be avoided that the switch 206 can be manipulated as well to maintain the connection 116 between the first set of terminals 102 and the second set of terminals 104 or to reconnect the first set of terminals 102 and the second set of terminals 104 despite an attack was detected and the connection 116 should be disconnected.

According to various embodiments, the switch 206 may be reset (e.g. switched back into the first switching state 206a) manually, e.g. via an authorized person that has physical access to the switch 206 or to a mechanism and/or circuit for resetting the switch 206. As an example, the controllable terminal connection structure 106 may further include a mechanical mechanism 216 for switching the switch 206 from the second switching state 206b into the first switching state 206a. A lockable mechanical protection structure 226 may be used to restrict a physical access 226a to the mechanical mechanism 216 to authorized persons only. As another example, the controllable terminal connection structure 106 may further include an additional controller (independent from the one or more processors 130) for switching the switch 206 from the second switching state 206b into the first switching state 206a.

According to various embodiments, the switch 206 may be reset (e.g. switched back into the first switching state 206a) manually, via an authorized person that has physical access to the switch 206 or to the additional controller for resetting the switch 206. The additional controller may be configured to require a manual input at a user interface to reset the switch. A lockable mechanical protection structure 226 may be used to restrict a physical access 226a to the user interface to authorized persons only.

Figure 3:
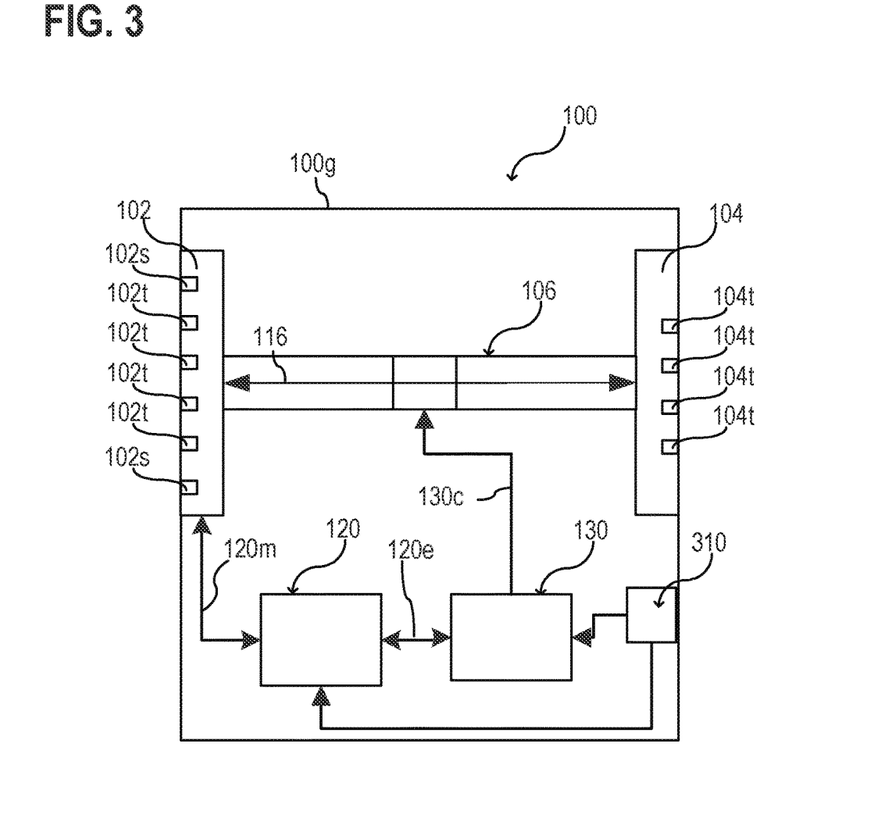
FIG. 3 is a schematic view showing a security device according to various embodiments.

There is illustrated in FIG. 3 a security device 100 in a schematic view, according to various embodiments. According to various embodiments, the security device 100 illustrated in FIG. 1 may include the same of similar features as described with reference to the security device 100 illustrated in FIG. 3.

According to various embodiments, the first set of terminals 102 and the second set of terminals 104 may each include at least four terminals 102t, 104t associated with at least four cores of a USB cable and/or at least four USB pins of the USB connector 112. Alternatively, as described above, the first set of terminals 102 and the second set of terminals 104 may each include five terminals 102t, nine terminals 102t, ten terminals 102t, or at least twenty-four terminals 102t depending on the type of USB interface.

Figure 7:
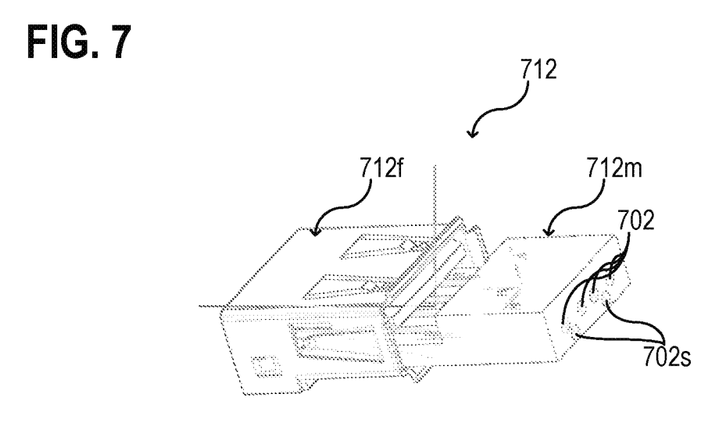
FIG. 7 is a schematic view showing a Universal-Serial-Bus connector arrangement according to various embodiments.

According to various embodiments, the first set of terminals 102 may include at least two additional terminals 102s associated with at least two additional cores of the USB cable and/or at least two additional pins of the USB connector 112, see for example FIG. 7.

According to various embodiments, the at least four terminals 102t of the first set of terminals 102 may be used for measuring 120m the one or more electrical properties 120e via the measurement circuit 120. Alternatively, or additionally, the at least two additional terminals 102s of the first set of terminals 102 may be used for measuring 120m the one or more electrical properties 120e via the measurement circuit 120.

According to various embodiments, the one or more electrical properties 120e may include an electrical resistance and/or an electrical impedance of any device, cable, connector, etc. that is/are connected to the first set of terminals 102. After an initial setup, the reference data associated with the one or more electrical properties 120e may be measured. The reference data representing a non-manipulated state of the device, cable, connector, etc. that is/are connected to the first set of terminals 102.

According to various embodiments, the security device 100 may further include at least one power supply (e.g. a battery) 310 to supply the one or more processors 130 and/or the measurement circuit 120. Illustratively, the one or more processors 130 and/or the measurement circuit 120 may be supplied via an internal power supply 310. The security device 100 may be configured as a stand-alone device disposed within a safe unit. This implements for example an additional security aspect, since it may be avoided that the security device 100 can be disabled by an unauthorized person, e.g. by manipulating a power supply. The power supply 310 may be disposed inside the housing 100g of the security device 100. As an example, the housing 100g of the security device 100 may be configured as a safe. Alternatively, the housing 100g of the security device 100 may be disposed in a safe.

Figure 4:
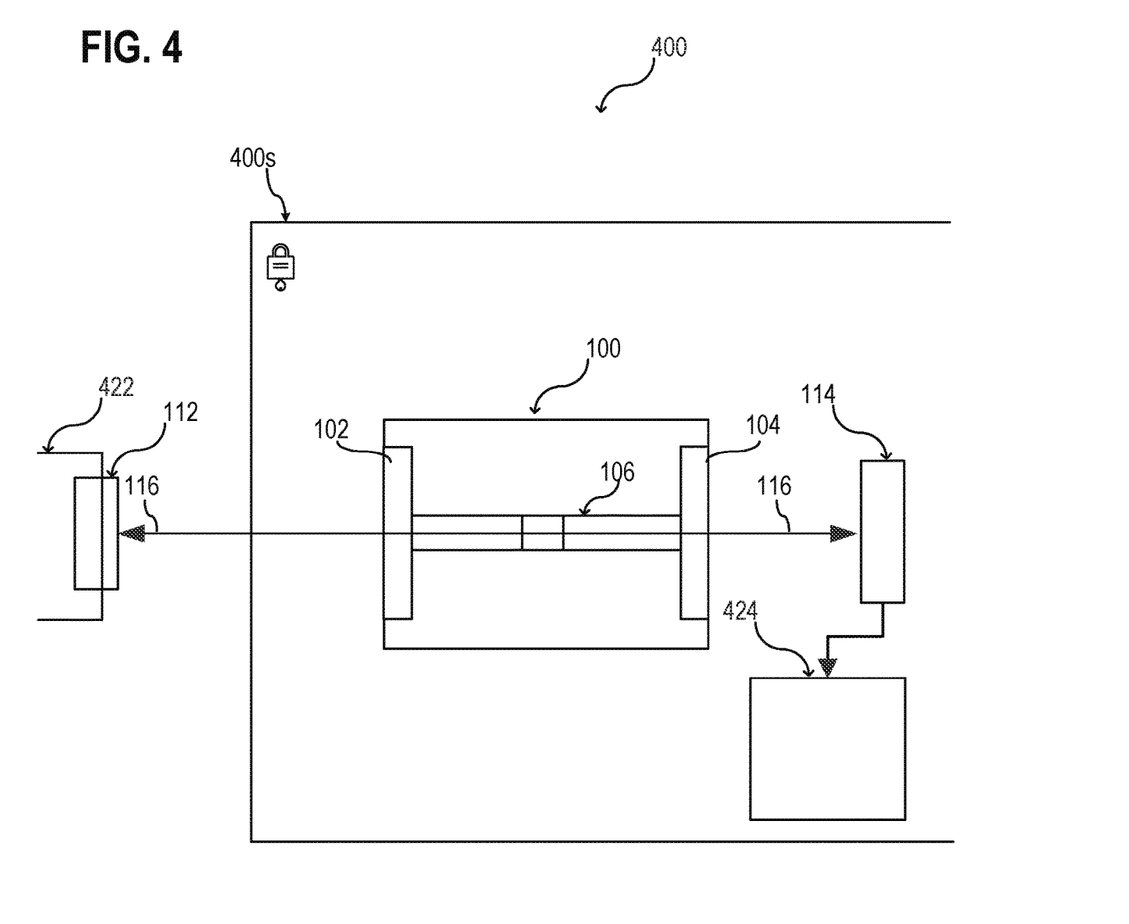
FIG. 4 is a schematic view showing an automated teller machine according to various embodiments.

There is illustrated in FIG. 4 an automated teller machine (ATM) 40 in a schematic view, according to various embodiments. The ATM 400 may include the security device 100 described herein to secure a USB interface of the ATM 400. However, any other communication interface may be protected in a similar way.

According to various embodiments, the ATM 400 may include a safe unit 400s. The interior of the safe unit 400s may be only accessible for authorized persons. In other words, the safe unit 400s may include a mechanical protection structure to restrict a physical access to the interior of the safe unit 400s and at least one door to access the interior of the safe unit 400s. The door may be protected via a locking mechanism or any other suitable structure.

According to various embodiments, the security device 100 may be disposed inside the safe unit 400s. Illustratively, the security device 100 may be configured to operate (e.g. to measure the one or more electronic properties 120e associated with the first set of terminals 102 and/or the USB connector 112 and the control of the controllable terminal connection structure 106) independently from any computing system outside the safe unit 400s.

According to various embodiments, the ATM 400 may include a USB connector 112 disposed outside the safe unit 400s and connected to the first set of terminals 102 of the security device 100. Further, the ATM may include an electronic device 114 disposed inside the safe unit 400s and connected to the second set of terminals 104 of the security device 100.

The ATM 400 may further include a computing system 422 disposed outside the safe unit 400s. The USB connector 112 may be connected to the computing system 422 or may be part of the computing system 422. According to various embodiments, the computing system 422 and the electronic device 114 may be configured to communicate with one another via the USB interface, wherein the security device 100 may be configured to monitor the USB interface to determine a manipulation (e.g. in the case of an attack) of the part of the USB interface disposed outside the safety unit 400s or of the computing system 422. The computing system 422 may be disposed in a head unit of the ATM 400.

According to various embodiments, the ATM 400 may further include an electromechanical device 424 disposed inside the safe unit 400s. The electronic device 114 may be configured to control an operation of the electromechanical device 424 based on control data transmitted via the USB connector 112. As an example, the computing system 422 may be configured to provide control data associated with an operation of the electromechanical device 424 and to provide the control data via the USB interface to the electronic device 114 that controls the electromechanical device 424 based on the control data. Alternatively, the electronic device 114 may be part of the electromechanical device 424 and the computing system 422 may be configured to control the electromechanical device 424.

Figure 5:
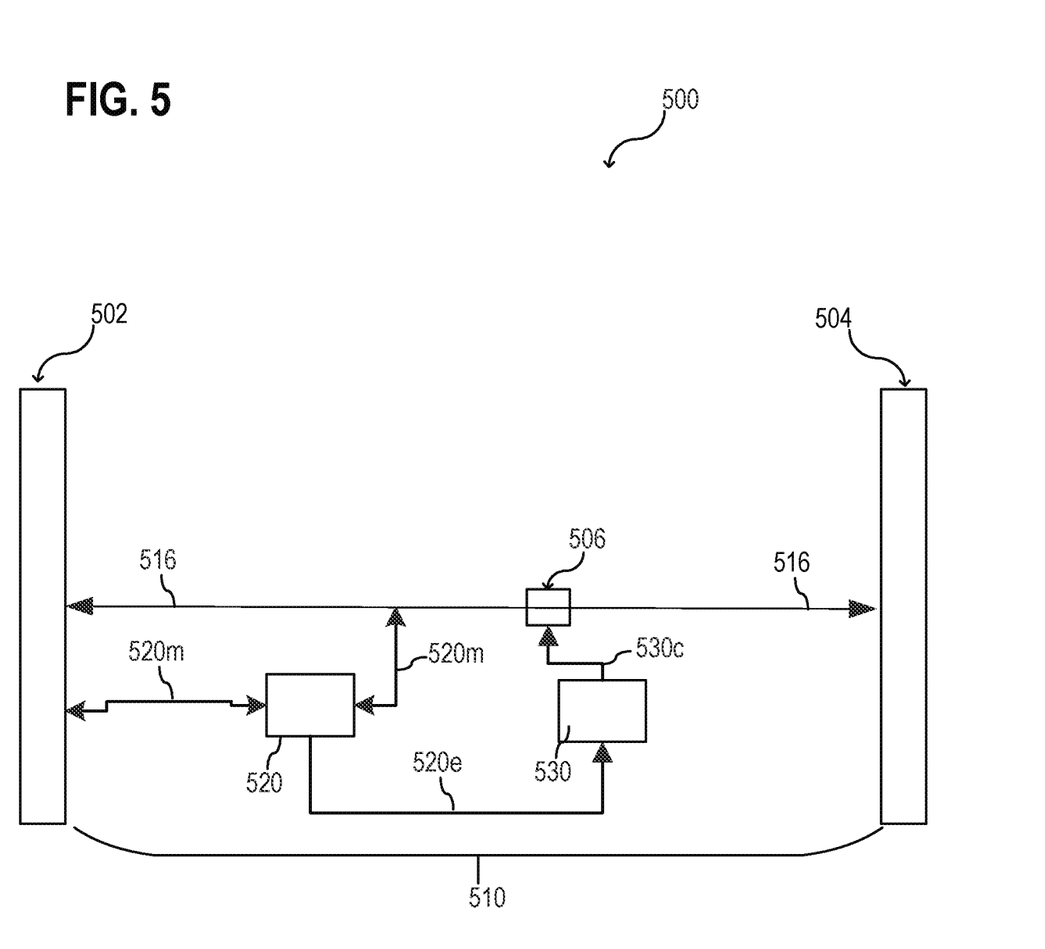
FIG. 5 is a schematic view showing an electronic device arrangement according to various embodiments.

There is illustrated in FIG. 5 an electronic device arrangement 500 in a schematic view, according to various embodiments. The electronic device arrangement 500 may include a first electronic device 502 and a second electronic device 504. A USB interface 510 may be used to communicatively couple the first electronic device 502 and the second electronic device 504 with one another. The USB interface 510 may include an electrical connection structure 516 to electrically conductively connect the first electronic device 502 and the second electronic device 504 with one another. The USB interface 510 may further include a switch 506 to disconnect the electrical connection structure 516, e.g. in a controlled manner.

According to various embodiments, the electronic device arrangement 500 may include a measurement circuit 520 to measure 520m one or more electrical properties 520e associated with the electrical connection structure 516 and/or the first electronic device 502. Further, the electronic device arrangement 500 may include one or more processors 530 configured to control 530c the switch 506 based on the measured one or more electrical properties 520e. As an example, the one or more processors 530 may be configured to trigger the switch 506 to disconnect the electrical connection structure 516 based on the measured one or more electrical properties 520e.

According to various embodiments, the electrical connection structure 516 may be controlled via a security device 100 or a similar device as described herein. As an example, the electronic device arrangement 500 may be an ATM, the first electronic device 502 may be a computing device disposed in a head unit of the ATM and including at least one USB connector. The second electronic device 504 may be an electromechanical tower (e.g. including the electronic device 114 and the electromechanical device 424) disposed in a safe unit of the ATM. The USB interface 510 that provides the communication between the two electronic devices 502, 504 may be monitored via the security device 100 to determine an attack to the second electronic device 504 via the USB interface 510 and/or the first electronic device 502, as described herein. An attack to the second electronic device 504 may include a manipulation of a USB cable, a USB connector, etc. An attack to the second electronic device 504 may further include a manipulation (e.g. a replacement, etc.) of the first electronic device 502.

According to various embodiments, the one or more electrical properties 520e may include an electrical resistance and/or an electrical impedance associated with at least a part of the electrical connection structure 516. Additionally, or alternatively, the one or more electrical properties 520e may include an electrical resistance and/or an electrical impedance associated with at least a part of the first electronic device 502.

Figure 6:
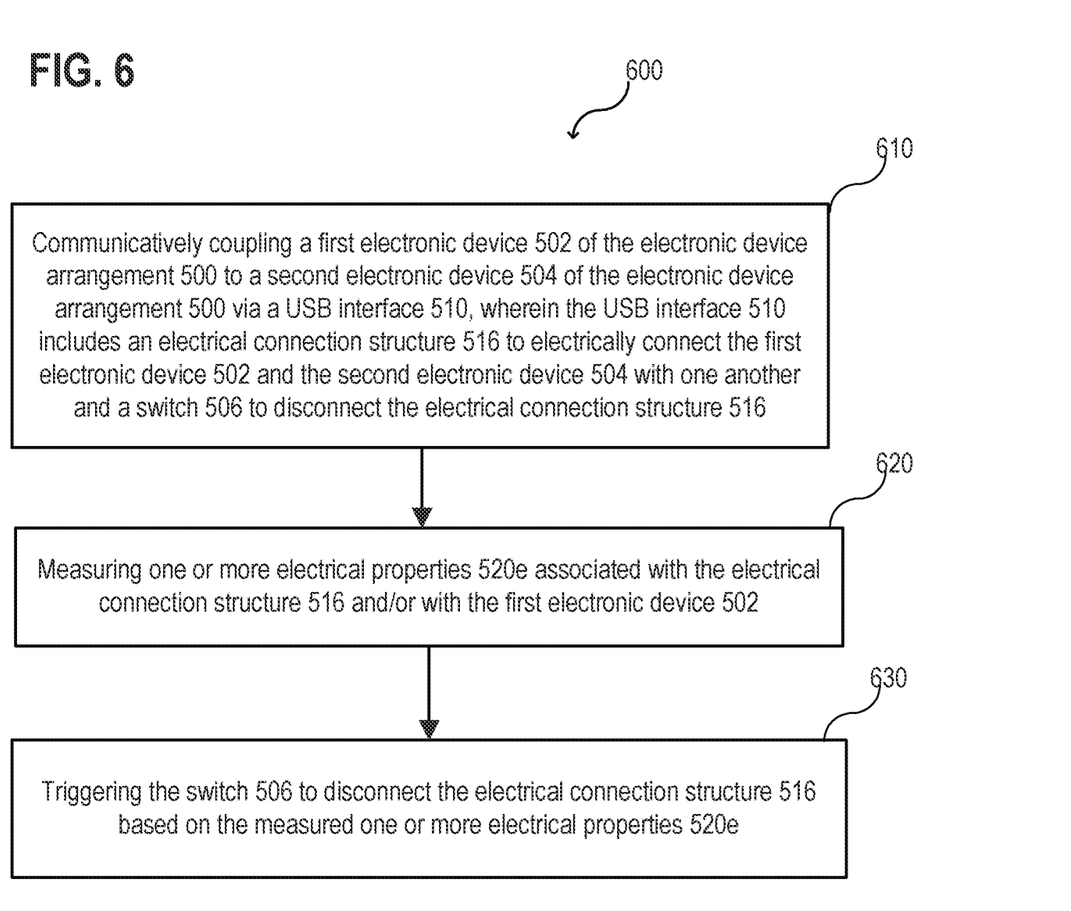
FIG. 6 is a schematic flow diagram showing a method for operating an electronic device arrangement according to various embodiments.

There is illustrated in FIG. 6 a schematic flow diagram of a method 600 for operating an electronic device arrangement 500, according to various embodiments. The method 600 may include: in 610, communicatively coupling a first electronic device 502 of the electronic device arrangement 500 to a second electronic device 504 of the electronic device arrangement 500 via a USB interface 510, wherein the USB interface 510 includes an electrical connection structure 516 to electrically connect the first electronic device 502 and the second electronic device 504 with one another and a switch 506 to disconnect the electrical connection structure 516; in 620, measuring one or more electrical properties 520e associated with the electrical connection structure 516 and/or with the first electronic device 502; and, in 630, triggering the switch 506 to disconnect the electrical connection structure 516 based on the measured one or more electrical properties 520e.

According to various embodiments, the switch 506 may be triggered when the measured one or more electrical properties 520e exceed or fall below one or more pre-defined thresholds.

According to various embodiments, the method 600 may further include, e.g. after triggering the switch 506, manually resetting the switch 506 via a mechanical mechanism to electrically connect the first electronic device 502 and the second electronic device 504 with one another. The mechanical mechanism may be configured as described herein with reference to the mechanical mechanism 216 of the security device 100.

According to various embodiments, the method 600 may further include, e.g. before manually resetting the switch 506, unlocking a mechanical protection structure to physically access the mechanical mechanism. The mechanical protection structure may be configured as described herein with reference to the lockable mechanical protection structure 226 of the security device 100 and/or the safe unit 400s of the ATM 400. In the case that the security device 100 is disposed within a safe unit (e.g. of an ATM), the safe unit may be the lockable mechanical protection structure 226.

There is illustrated in FIG. 7 a USB connector arrangement 712 in a schematic view, according to various embodiments. The USB connector arrangement 712 may include a USB port 712f and a USB plug 712m plugged into the USB port 712f. According to various embodiments, the USB plug 712m may be the USB connector 112 of the security device 100 described herein. In this case, the USB plug 712m may be connected with a computing device 422, e.g. with a USB port of the computing device 422, as described herein. Alternatively, the USB port 712f may be the USB connector 112 of the security device 100 described herein. In this case, any suitable electronic device including a USB plug 712m may be connected with the USB port 712f.

According to various embodiments, the USB connector, e.g. the USB plug 712m, may include at least four pins 702 and at least two additional pins 702s. The additional pins 702s may be used to measure the one or more electrical properties via the measurement circuit, e.g. when the USB connector is connected to the first terminal 102 of the security device 100, accordingly.

According to various embodiments, the additional pins 702s may be used to identify and/or to authenticate any electronic device coupled to the USB connector. A pre-defined electronic device to be connected to the USB connector may include, for example, a pre-defined electrical resistance. The measurement circuit may be used to measure the actual electrical resistance of an electronic device connected to the USB connector and the one or more processors may be configured to compare the measured the actual electrical resistance of the electronic device connected to the USB connector with the pre-defined electrical resistance to determine whether the predefined electronic device is connected to the USB connector or another (e.g. manipulated) device. In the case that no predefined electronic device is connected to USB connector, the one or more processors may be configured to disable the USB interface.

In a similar way, the additional pins 702s may be used to identify and/or to authenticate the USB connector itself. A predefined USB connector to be connected to the first set of terminals 102 of the security device 100 may include, for example, a pre-defined electrical resistance. The measurement circuit may be used to measure the actual electrical resistance of an USB connector that is connected to the first set of terminals 102 of the security device 100 and the one or more processors may be configured to compare the measured the actual electrical resistance of the USB connector with the pre-defined electrical resistance to determine whether the predefined USB connector is connected to the first set of terminals 102 of the security device 100 or another (e.g. manipulated) structure. In the case that no predefined USB connector is connected to the first set of terminals 102 of the security device 100, the one or more processors may be configured to disable the USB interface.

According to various embodiments, the USB connector 712f, 712m may include additional pins 702s and a pre-defined electrical resistor electrically connecting the additional pins 702s with one another.

In the following, various examples are provided that refer to the embodiments described herein.

Example 1 is a security device 100 including: a first set of terminals 102 to connect the security device 100 with a Universal-Serial-Bus 112 connector, a second set of terminals 104 to connect the security device 100 with an electronic device 114, a controllable terminal connection structure 106 to connect the first set of terminals 102 and the second set of terminals 104 with one another and to disconnect the first set of terminals 102 and the second set of terminals 104 from one another to control a physical connection 116 of the Universal-Serial-Bus connector 112 to the electronic device 114; a measurement circuit 120 coupled to the first set of terminals 102 to measure 120m one or more electrical properties 120e associated with the Universal-Serial-Bus connector 112 when connected to the first set of terminals 102; and one or more processors 130 configured to control 130c the controllable terminal connection structure 106 based on the determined one or more electrical properties 120e.

In example 2 the security device 100 of example 1 may optionally include that the controllable terminal connection structure 106 includes a switch 206 having a first switching state 206a in which the first set of terminals 102 and the second set of terminals 104 are connected with one another and a second switching state 206b in which the first set of terminals 102 and the second set of terminals 104 are disconnected from one another.

In example 3, the security device 100 of example 2 may optionally include that the one or more processors 130 are configured to control the controllable terminal connection structure 106 only by switching the switch 206 from the first switching state 206a into the second switching state 206b.

In example 4, the security device 100 of example 2 or 3 may optionally include that the controllable terminal connection structure 106 further includes a mechanical mechanism 216 for switching the switch 206 from the second switching state 206b into the first switching state 206a.

In example 5, the security device 100 of example 4 may optionally include a lockable mechanical protection structure 226 configured to restrict a physical access 226a to the mechanical mechanism 216.

In example 6, the security device 100 of any one of examples 1 to 5 may optionally include that the first set of terminals 102 and the second set of terminals 104 each include at least four terminals 102t, 104t associated with at least four cores of a Universal-Serial-Bus cable and/or at least four Universal-Serial-Bus pins of the Universal-Serial-Bus connector.

In example 7, the security device 100 of example 6 may optionally include that the first set of terminals 102 includes at least two additional terminals 102s associated with at least two additional cores of the Universal-Serial-Bus cable and/or at least two additional pins of the Universal-Serial-Bus connector.

In example 8, the security device 100 of any one of examples 1 to 7 may optionally include that the one or more electrical properties 120e include an electrical resistance and/or an electrical impedance.

In example 9, the security device 100 of any one of examples 1 to 8 may optionally include a power supply 310 to supply the one or more processors 130 and/or measurement circuit 120. The power supply 310 may be or may include a battery.

Example 10 is an automated teller machine 400 including: a safe unit 400s; a security device 100 of any one of examples 1 to 9 disposed inside the safe unit 400s; a Universal-Serial-Bus connector 112 disposed outside the safe unit 400s and connected to the first set of terminals 102 of the security device 100; and an electronic device 114 disposed inside the safe unit 400s and connected to the second set of terminals 104 of the security device 100.

In example 11, the automated teller machine 400 of example 10 may optionally include an electromechanical device 424 disposed inside the safe unit 400s. The electronic device 114 may be configured to control operation of the electromechanical device 424 based on control data transmitted via the Universal-Serial-Bus connector 112.

In example 12, the automated teller machine 400 of example 10 or 11 may optionally include a computing system 422 disposed outside the safe unit. The Universal-Serial-Bus connector 112 may be connected to the computing system 422 or may be part of the computing system 422.

Example 13 is an electronic device arrangement 500 including: a first electronic device 502, a second electronic device 504, a Universal-Serial-Bus interface 510 communicatively coupling the first electronic device 502 and the second electronic device 504 with one another, wherein the Universal-Serial-Bus interface 510 includes an electrical connection structure 516 to electrically connect the first electronic device 502 and the second electronic device 504 with one another and a switch 506 to disconnect the electrical connection structure 516; a measurement circuit 520 to measure one or more electrical properties 520e associated with the electrical connection structure 516 and/or the first electronic device 502; and one or more processors 530 configured to control the switch 506 based on the measured one or more electrical properties 520e.

In example 14, the electronic device arrangement 500 of example 13 may optionally include that the electrical connection structure 516 includes a first set of terminals and a second set of terminals. The first electronic device 502 and the second electronic device 504 may be connected to the first set of terminals and the second set of terminals respectively via the electrical connection structure 516.

In example 15, the electronic device arrangement 500 of example 14 may optionally include that the switch 506 has a first switching state in which the first set of terminals and the second set of terminals are connected with one another and a second switching state in which the first set of terminals and the second set of terminals are disconnected from one another.

In example 16, the electronic device arrangement 500 of example 15 may optionally include that the one or more processors 530 are configured to control the switch 506 only by triggering a switching from the first switching state into the second switching state when the measured one or more electrical properties 520e exceed or fall below one or more pre-defined thresholds.

In example 17, the electronic device arrangement 500 of example 15 or 16 may optionally include a mechanical mechanism to manually switch the switch 506 from the second switching state into the first switching state.

In example 18, the electronic device arrangement 500 of example 17 may optionally include a lockable mechanical protection structure configured to restrict a physical access to the mechanical mechanism.

In example 19, the electronic device arrangement 500 of any one of examples 14 to 18 may optionally include that the first set of terminals and the second set of terminals each include at least four terminals associated with at least four cores of a Universal-Serial-Bus cable and/or at least four Universal-Serial-Bus pins of a Universal-Serial-Bus connector.

In example 20, the electronic device arrangement 500 of example 19 may optionally include that the first set of terminals includes at least two additional terminals associated with at least two additional cores of the Universal-Serial-Bus cable and/or at least two additional pins of the Universal-Serial-Bus connector.

In example 21, the electronic device arrangement 500 of any one of examples 13 to 20 may optionally include that the one or more electrical properties 520e include an electrical resistance and/or an electrical impedance associated with at least a part of the electrical connection structure 516; and/or that the one or more electrical properties 520e include an electrical resistance and/or an electrical impedance associated with at least a part of the first electronic device 502.

In example 22, the electronic device arrangement 500 of any one of examples 13 to 21 may optionally include an electromechanical device 424. The second electronic device 504 may be configured to control operation of the electromechanical device 424 based on control data transmitted via the Universal-Serial-Bus interface 510.

Example 23 is a method 600 for operating an electronic device arrangement 500, the method 600 including: communicatively coupling a first electronic device 502 of the electronic device arrangement 500 to a second electronic device 504 of the electronic device arrangement 500 via a Universal-Serial-Bus interface 510, wherein the Universal- Serial-Bus interface 510 includes an electrical connection structure 516 to electrically connect the first electronic device 502 and the second electronic device 504 with one another and a switch 506 to disconnect the electrical connection structure 516; measuring one or more electrical properties 520e associated with the electrical connection structure 516 and/or with the first electronic device 502; and triggering the switch 506 to disconnect the electrical connection structure 516 based on the measured one or more electrical properties 520e.

In example 24, the method 600 of example 23 may optionally include that the switch 506 is triggered when the measured one or more electrical properties 520e exceed or fall below one or more pre-defined thresholds.

In example 25, the method 600 of example 23 or 24 may optionally include: after triggering the switch 506, manually resetting the switch 506 via a mechanical mechanism to electrically connect the first electronic device 502 and the second electronic device 504 with one another.

In example 26, the method 600 of example 25 may optionally include: before manually resetting the switch 506, unlocking a mechanical protection structure to physically access the mechanical mechanism.

While specific embodiments have been particularly shown and described, it should be understood by those skilled in the art that various changes in form and detail may be made therein without departing from the spirit and scope as defined by claims. The scope is indicated by the claims and all changes, which come within the meaning and range of equivalency of the claims, are therefore intended to be embraced.

What is claimed is:

1. A security device comprising:
   a first set of terminals to connect the security device with a Universal-Serial-Bus connector,
   a second set of terminals to connect the security device with an electronic device,
   a controllable terminal connection structure to connect the first set of terminals and the second set of terminals with one another and to disconnect the first set of terminals and the second set of terminals from one another to control a physical connection of the Universal-Serial-Bus connector to the electronic device;
   a measurement circuit coupled to the first set of terminals to measure one or more electrical properties associated with the Universal-Serial-Bus connector when connected to the first set of terminals; and
   one or more processors configured to control the controllable terminal connection structure based on the determined one or more electrical properties,
   wherein the controllable terminal connection structure comprises a switch having a first switching state in which the first set of terminals and the second set of terminals are connected with one another and a second switching state in which the first set of terminals and the second set of terminals are disconnected from one another,
   wherein the one or more processors are configured to control the controllable terminal connection structure only by switching the switch from the first switching state into the second switching state,
   wherein the controllable terminal connection structure further comprises an additional controller for switching the switch from the second switching state into the first switching state, wherein the additional controller is independent from the one or more processors and configured to require a manual input at a user interface to switch the switch from the second switching state into the first switching state, and
   wherein the security device further comprises a lockable mechanical protection structure configured to restrict a physical access to the user interface.

2. The security device of claim 1,
   wherein the controllable terminal connection structure further comprises a mechanical mechanism for switching the switch from the second switching state into the first switching state.

3. The security device of claim 1,
   wherein the first set of terminals and the second set of terminals each comprise at least four terminals associated with at least four cores of a Universal-Serial-Bus cable and/or at least four Universal-Serial-Bus pins of the Universal-Serial-Bus connector.

4. The security device of claim 3,
   wherein the first set of terminals further comprises at least two additional terminals associated with at least two additional cores of the Universal-Serial-Bus cable and/or at least two additional pins of the Universal-Serial-Bus connector.

5. The security device of claim 1,
   wherein the one or more electrical properties includes an electrical resistance and/or an electrical impedance.

6. The security device of claim 1, further comprising:
   a power supply to supply power to the one or more processors and/or measurement circuit.

7. An automated teller machine comprising:
   a safe unit;
   a security device connected to a Universal-Serial-Bus and to an electronic device, comprising:
      a controllable terminal connection structure to control a physical connection of the Universal-Serial-Bus to the electronic device, the controllable terminal connection structure including a switch having a first switching state in which the security device and the electronic device are connected with one another and a second switching state in which the security device and the electronic device are disconnected from one another;
      a measurement circuit to measure one or more electrical properties associated with the Universal-Serial-Bus; and
      one or more processors configured to control the connection and trigger the switch to change state based on the determined one or more electrical properties,
      wherein the security device is disposed inside the safe unit;
   the Universal-Serial-Bus is connected to the security device outside the safe unit; and
   the electronic device is disposed inside the safe.

8. The automated teller machine of claim 7, further comprising:
   an electromechanical device disposed inside the safe unit, wherein the electronic device is configured to control operation of the electromechanical device based on control data transmitted via the Universal-Serial-Bus.

9. The automated teller machine of claim 7, further comprising:
   a computing system disposed outside the safe unit, wherein the Universal-Serial-Bus is connected to the computing system or is part of the computing system.

10. The automated teller machine of claim 7, where the one or more processors includes a first processor and a second processor, the first processor and the second processor independent from each other, and where the first processor controls the physical connection of the Universal-Serial-Bus to the electronic device and the second processor controls the switch.

11. A method for operating an electronic device arrangement, the method comprising:
communicatively coupling a first electronic device of the electronic device arrangement to a second electronic device of the electronic device arrangement via a Universal-Serial-Bus interface, wherein the Universal-Serial-Bus interface comprises an electrical connection structure to electrically connect the first electronic device and the second electronic device with one another and a switch to disconnect the electrical connection structure;
measuring one or more electrical properties associated with the electrical connection structure and/or with the first electronic device; and
triggering the switch via one or more processors configured to trigger the switch to disconnect the electrical connection structure based on the measured one or more electrical properties; and
after triggering the switch, manually resetting the switch, wherein manually resetting the switch comprises manually resetting the switch via a manual input at a user interface of an additional controller independent from the one or more processors; and
before manually resetting the switch, unlocking a mechanical protection structure to physically access the user interface.

12. The method of claim 11,
wherein manually resetting the switch is via a mechanical mechanism to electrically connect the first electronic device and the second electronic device with one another.

* * * * *